Sept. 15, 1953         J. H. ZACHARY         2,652,008

APPARATUS FOR MANUFACTURING ARTIFICIAL MUSHROOMS

Filed Sept. 20, 1947

Inventor
James Hudson Zachary

By Robert M. Dunning

Patented Sept. 15, 1953

2,652,008

UNITED STATES PATENT OFFICE 2,652,008

APPARATUS FOR MANUFACTURING ARTIFICIAL MUSHROOMS

James Hudson Zachary, Arlington, Calif.

Application September 20, 1947, Serial No. 775,258

4 Claims. (Cl. 107—8)

My invention relates to an improvement in apparatus for manufacturing artificial mushrooms and lies particularly in the apparatus for producing an edible product having the shape, taste and appearance of mushrooms.

I have found that many persons would prefer not to eat natural mushrooms because of fatal accidents which have occurred by mistaking mushrooms for other similarly shaped plants. Furthermore, I have found that mushrooms have but little nourishment value and are eaten mainly because of their unusual taste and texture. I have also found that gluten if properly prepared can produce a product very similar in shape, appearance and texture to mushrooms. I have also found that the taste of the gluten, if flavored slightly, is not unlike that of mushrooms.

It is the object of the present invention to provide apparatus for the manufacture of a product simulating natural mushrooms in taste, appearance and texture. These artificial mushrooms may be produced for a relatively low cost by the apparatus hereinafter described and have all of the desirable characteristics of the natural plant.

A feature of the present invention lies in the provision of artificial mushrooms formed from gluten made of wheat kernels. This product when molded into proper form by my apparatus has all of the appearance of natural mushrooms and is extremely similar in texture to the natural plants.

These and other objects and novel features of my invention will be more clearly and fully set forth in the following specification and claims.

In the drawings forming a part of my specification:

In forming my manufactured artificial mushrooms, I employ gluten which is formed of wheat kernels by a method described in detail in my now abandoned, previously filed application for patent, Serial No. 746,953, filed May 9, 1947. In preparing the gluten the wheat kernels are first cracked in an attrition mill into relatively small size. The fractured grain is then screened to separate the small particles from the larger particles, the smaller parts being immediately ready for introduction into the starch extracting process. The larger particles of grain are then screened so as to separate the largest particles from the smaller particles, the larger particles being retained to be further broken up. The particles passing through the second screen are subjected to an aspirating process so that the light fibrous portions of the grain may be separated from the solid particles. The epidermis or testa are thus separated from the remaining parts of the grain as these fibrous particles are coarse in structure and possess little food value.

The properly fractured grain particles are next soaked in water in a percentage of approximately equal parts of grain kernels in water for approximately an hour at substantially room temperature. The paste thus formed is mixed with a device similar to a bread mixer for ten or fifteen minutes to thoroughly intermix the particles. After thorough mixing an amount of water is added which equals twice the volume of the mixed paste. This water is allowed to adsorb into the wheat particles to dissolve soluble portions of the endosperm. If the particles are of substantial size they are held apart and allow the water to thoroughly intermix therewith.

After a thorough soaking with the water, the water is drained off from time to time and replenished to substantially the original proportion until the water removed is clear rather than milky. Any floating parts of the grain kernels may be removed if desired. The gluten remains after the washing operation and comprises a sticky mass of material in which the grain particles have lost their identity and have become a part of the solid mass.

After the washing process the gluten is ground and processed. In accomplishing this result the gluten is placed through a device somewhat similar to a meat grinder so as to grind the material to proper size.

The gluten prepared as above described is next mixed with certain additional ingredients particularly of value in flavoring the mixture. A relatively small amount of yeast, flour, vegetable shortening, onions, or onion flavoring, mushroom flavoring and salt are added to the gluten.

Figure 1:
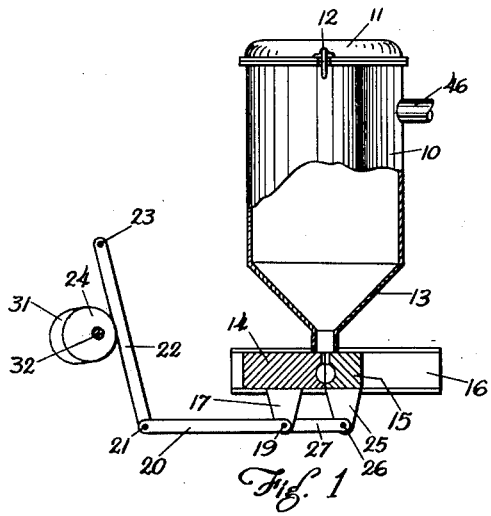
Figure 1 is a diagrammatic elevation view of an apparatus for molding artificial mushrooms.
Figure 3:
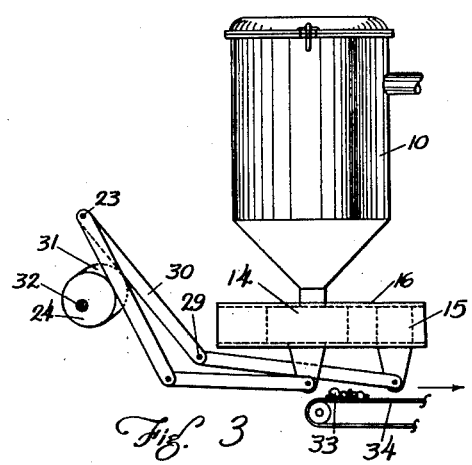
Figure 3 is a view similar to Figures 1 and 2 showing a third step in the molding process.
Figure 2:
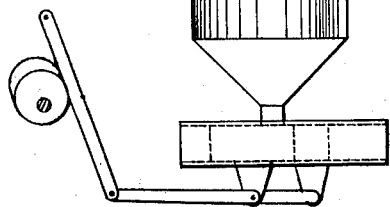
Figure 2 is a view similar to Figure 1 showing a different step of the molding process.

After the foregoing ingredients have been thoroughly mixed with the gluten, the mixture is placed in the apparatus illustrated in Figures 1, 2, and 3 of the drawings. This apparatus includes a tank or hopper 10 having a lid or closure 11 therefor which is tightly sealed by clamps 12 or other suitable means. The tank 10 is provided with a tapered lower end 13 having a central opening therein. This central opening is closed either by a combination of the two die plates 14 and 15 used in the formation of my artificial mushrooms, or by the top of the plate 14 alone. The die blocks 14 and 15 are laterally slidable in a suitable slide 16. This slide 16 engages the side edges of the die blocks, leaving the bottoms thereof open. Means are provided to move the die blocks so as to move the mold apertures into and out of registry with the hopper shaped bottom 13 of the tank 10. For the purpose of illustration, the die block 14 is provided with one or more downwardly projecting lugs 17 which are hingedly connected at 19 to a link 20. The link 20 is pivotally connected at 21 to a lever 22 pivoted at 23. A cam 24 is engageable with the lever 22 to move the same in a counter-clockwise direction around the fixed pivot 23.

The die block 15 is likewise provided with downwardly projecting lugs 25 which are hingedly connected at 26 to a link 27. The link 27 is pivotally connected at 29 to a lever 30 which is pivoted on the pivot 23. The lever 30 is operated by means of the cam 31 on the same shaft 32 as the cam 24.

The cams 24 and 31 are properly shaped to move the die blocks 14 and 15 to the right simultaneously until the body of the die block 14 is in registry with the opening at the bottom of the tank 10. The die block 14 then continues movement at a substantially similar rate while the cam 31 forces the lever 30 at an increased rate of speed further to the right, thereby moving the die block 15 away from the die block 14 as illustrated in Figure 3 of the drawings.

Figure 5:
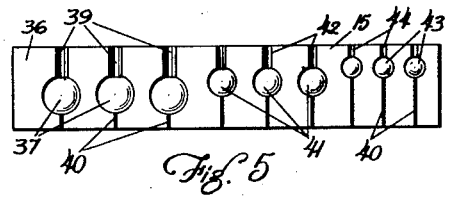
Figure 5 is an elevational view of one part of the mold showing the construction thereof.
Figure 4:
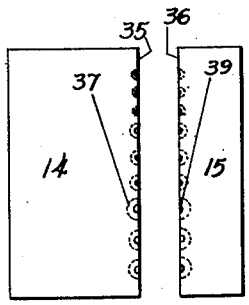
Figure 4 is a diagrammatic top plan view of the die used in molding the artificial mushrooms.

In other words, the die blocks 14 and 15 are shown in filling position in Figure 1 of the drawings. These die blocks are shown in tank closing position in Figure 2 of the drawings, but the die blocks are still in registry. Figure 3 shows the die blocks separated to allow the molded material 33 to drop upon the conveyor belt 34 for shipping or packing purposes. The die blocks 14 and 15 are best illustrated in Figures 4 and 5 of the drawings. The die block 14 is relatively wide and has a flat upper surface which closes the opening at the lower end of the tank 10 when the die blocks are not in filling position. The die blocks are provided with abutting faces 35 and 36 which are similar in form, but arranged in opposed relationship. Each of the faces 35 and 36 is provided with a spaced series of semi-spherical apertures which may vary in diameter. In the die blocks illustrated each surface 36 is provided with four semi-spherical apertures 37 of relatively large size. Each of these recesses is connected by a semi-cylindrical connecting stem 39. A semi-spherical air outlet opening 40 extends to the under-surface of the mold to allow the air within the mold pockets to be exhausted while the material is being forced therein. Each mold face 35 and 36 is likewise provided with four semi-spherical recesses 41 which are of smaller diameter than the recess 40 and which are connected with the upper surface of the mold by semi-cylindrical apertures 42 of smaller diameter than the apertures 39. Each mold face is likewise provided with four smaller diameter semi-spherical pockets 43 connected to the upper surface of the mold by semi-cylindrical grooves or passages 44. Bleed openings 40 connect each of the pockets 41 and 43 with the undersurface of the mold to allow the exhausting of air from the mold.

Figure 6:
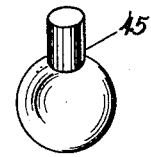
Figure 6 is a perspective view of an artificial mushroom formed in my molding apparatus.

The product formed by the mold is similar to the shape of a natural mushroom and one of my manufactured artificial mushrooms is illustrated at 45 in Figure 6 of the drawings. All of the artificial mushrooms are somewhat similarly proportioned, but the variation in size permits a more natural appearance of the artificial mushrooms when used as the natural mushrooms vary considerably in size.

The tank 10 is provided with a pressure pipe 40 extending thereinto so that pressure may be applied above the gluten to force it into the various mold cavities. When the die blocks 14 and 15 are arranged with their meeting face in alignment with the open lower end of the tank 10, the mold apertures will be filled with the gluten mixture. The die blocks are then moved to the right as illustrated in Figures 2 and 3 of the drawings, allowing the molded artificial mushrooms to drop upon the conveyor belt to be conveyed to a convenient location for packing.

I have found that artificial mushrooms thus produced are similar in size, shape and appearance to natural mushrooms and are possessed of approximately the same texture. When the artificial mushrooms are molded the outer surface thereof becomes smooth and unbroken similar to the smooth outer surface of the natural mushroom. At the same time when the artificial mushrooms are cut open they have a porous texture similar to that of natural mushrooms.

In accordance with the patent statutes, I have described the principles of composition and formation of my manufactured artificial mushrooms, and while I have endeavored to set forth the best embodiment thereof, I desire to have it understood that obvious changes may be made within the scope of the following claims without departing from the spirit of my invention.

I claim:

1. An apparatus for manufacturing artificial mushrooms comprising a pressure tank having an opening in the lower end thereof, a pair of mold blocks having a vertical line of separation and having cavities therein adjacent said line of separation, means supporting said mold blocks for lateral slidable movement beneath said tank, and mechanism for sliding said blocks simultaneously, said mechanism including means for limiting the sliding of one of said blocks when said block is in registry with the opening of said pressure tank to thereby seal said opening, said mechanism including means for continuing the motion of the other of said blocks beyond the limit of movement of said one block to provide sufficient relative separation thereof for release of the artificial mushrooms from said cavities.

2. The apparatus described in claim 1 in which the mold blocks are provided with a series of cavities in spaced alignment with each other along the line of separation of said blocks.

3. The apparatus described in claim 2 in which said cavities are of similar shape but of varying size.

4. An apparatus for manufacturing artificial mushrooms comprising a pressure tank having an opening in the bottom thereof, a pair of mold blocks having a vertical line of separation and having cavities therein adjacent said line of separation, means supporting said mold blocks for lateral slidable movement beneath said tank, articulated linkage elements connected respectively with said blocks, and a pair of rotatable cam elements for actuating said linkage elements, one of said cam elements acting to limit movement of one of said blocks while it is in registry with the opening of said pressure tank to thereby seal said opening and the other of said cam elements having a promontorial segment of continuing eccentricity to thereby cause greater movement of the other block after stoppage of said first block to release the artificial mushrooms from said cavities.

JAMES HUDSON ZACHARY.

References Cited in the file of this patent

UNITED STATES PATENTS

| Number | Name | Date |
|---|---|---|
| 398,368 | Ball | Feb. 26, 1889 |
| 1,001,149 | Kellogg | Aug. 22, 1911 |
| 1,001,150 | Kellogg | Aug. 22, 1911 |
| 1,289,275 | Sargent | Dec. 31, 1918 |
| 1,331,693 | Bunde | Feb. 24, 1920 |
| 1,852,259 | Parsons | Apr. 5, 1932 |
| 1,891,230 | Harnden | Dec. 20, 1932 |
| 2,166,568 | Kuhlke | July 18, 1939 |
| 2,200,633 | Morin et al. | May 14, 1940 |
| 2,208,905 | Kremmling et al. | July 23, 1940 |
| 2,212,991 | Sobel | Aug. 27, 1940 |